(12) United States Patent
Breu

(10) Patent No.: US 10,855,667 B2
(45) Date of Patent: Dec. 1, 2020

(54) USING KEYS WITH TARGETED ACCESS TO THE BLOCKCHAIN TO VERIFY AND AUTHENTICATE IDENTITY

(71) Applicant: Paypal, Inc., San Jose, CA (US)

(72) Inventor: Lorenz Lee Breu, Palo Alto, CA (US)

(73) Assignee: PAYPAL, INC., San Jose, CA (US)

( * ) Notice: Subject to any disclaimer, the term of this patent is extended or adjusted under 35 U.S.C. 154(b) by 267 days.

(21) Appl. No.: 15/995,655

(22) Filed: Jun. 1, 2018

(65) Prior Publication Data

US 2019/0372956 A1 Dec. 5, 2019

(51) Int. Cl.

| H04L 29/06 | (2006.01) |
|---|---|
| H04L 9/00 | (2006.01) |
| H04L 9/32 | (2006.01) |
| H04L 9/30 | (2006.01) |
| H04L 9/08 | (2006.01) |

(52) U.S. Cl.
CPC .......... *H04L 63/0807* (2013.01); *H04L 9/006* (2013.01); *H04L 9/0861* (2013.01); *H04L 9/30* (2013.01); *H04L 9/3213* (2013.01); *H04L 2209/38* (2013.01)

(58) Field of Classification Search
CPC ...... H04L 9/30; H04L 9/0861; H04L 2209/38
See application file for complete search history.

(56) References Cited

U.S. PATENT DOCUMENTS

| 9,300,473 | B2 | 3/2016 | Nix | |
|---|---|---|---|---|
| 10,129,025 | B2 * | 11/2018 | McCallum | ............ H04L 9/0894 |
| 10,715,312 | B2 * | 7/2020 | Sundaresan | ............... H04L 9/14 |
| 2007/0174618 | A1 * | 7/2007 | Nakano | ..................... H04L 9/30 |
| | | | | 713/171 |
| 2014/0189834 | A1 | 7/2014 | Metke et al. | |
| 2017/0180128 | A1 | 6/2017 | Lu | |
| 2018/0144114 | A1 | 5/2018 | Fiske | |
| 2019/0163896 | A1 * | 5/2019 | Balaraman | ............ H04L 9/3213 |
| 2019/0342290 | A1 * | 11/2019 | Mittal | .................. H04L 63/083 |

OTHER PUBLICATIONS

International Search Report and Written Opinion issued for International Application No. PCT/US19/34849, ISA/US, dated Oct. 3, 2019, 17 pages.

* cited by examiner

*Primary Examiner* — Thaddeus J Plecha
(74) *Attorney, Agent, or Firm* — Haynes and Boone, LLP

(57) ABSTRACT

Systems and methods for accessing credentials from a blockchain are provided. A computing device requests for a server to process a transaction. In response to the request, the server transmits a server public key to the computing device. A key generator of the computing devices uses the user private key and the server public key to generate a user public key. The user public key includes permissions to access credentials that are stored on blockchain. The server receives the user public key and generates a request for credentials to blockchain. The request includes the user public key and the server private key. The blockchain receives the request and generates an identity token. The identity token includes credentials that are specified in the user public key. The blockchain transmits the identity token to the server and the server uses the identity token to processes the transaction.

20 Claims, 7 Drawing Sheets

USING KEYS WITH TARGETED ACCESS TO THE BLOCKCHAIN TO VERIFY AND AUTHENTICATE IDENTITY

TECHNICAL FIELD

The disclosure generally relates to identity authentication, and more specifically to accessing credentials on a blockchain to authenticate identity of a user.

BACKGROUND

As part of an authentication process, conventional systems typically request user credentials from a user and store the user credentials internally for use in processing subsequent authentication requests. However, with online identity theft increasing each year, theft of user credentials becomes a higher security concern. This is because hackers can obtain access to the systems that store user credentials, steal the credentials, and use the credentials in unauthorized ways, such as selling credentials to another party, opening unauthorized user accounts, stealing user identities, etc.

Accordingly, what is needed is a system that stores user credentials more securely than conventional systems and provides targeted credentials to authenticate the user.

Figure 1:
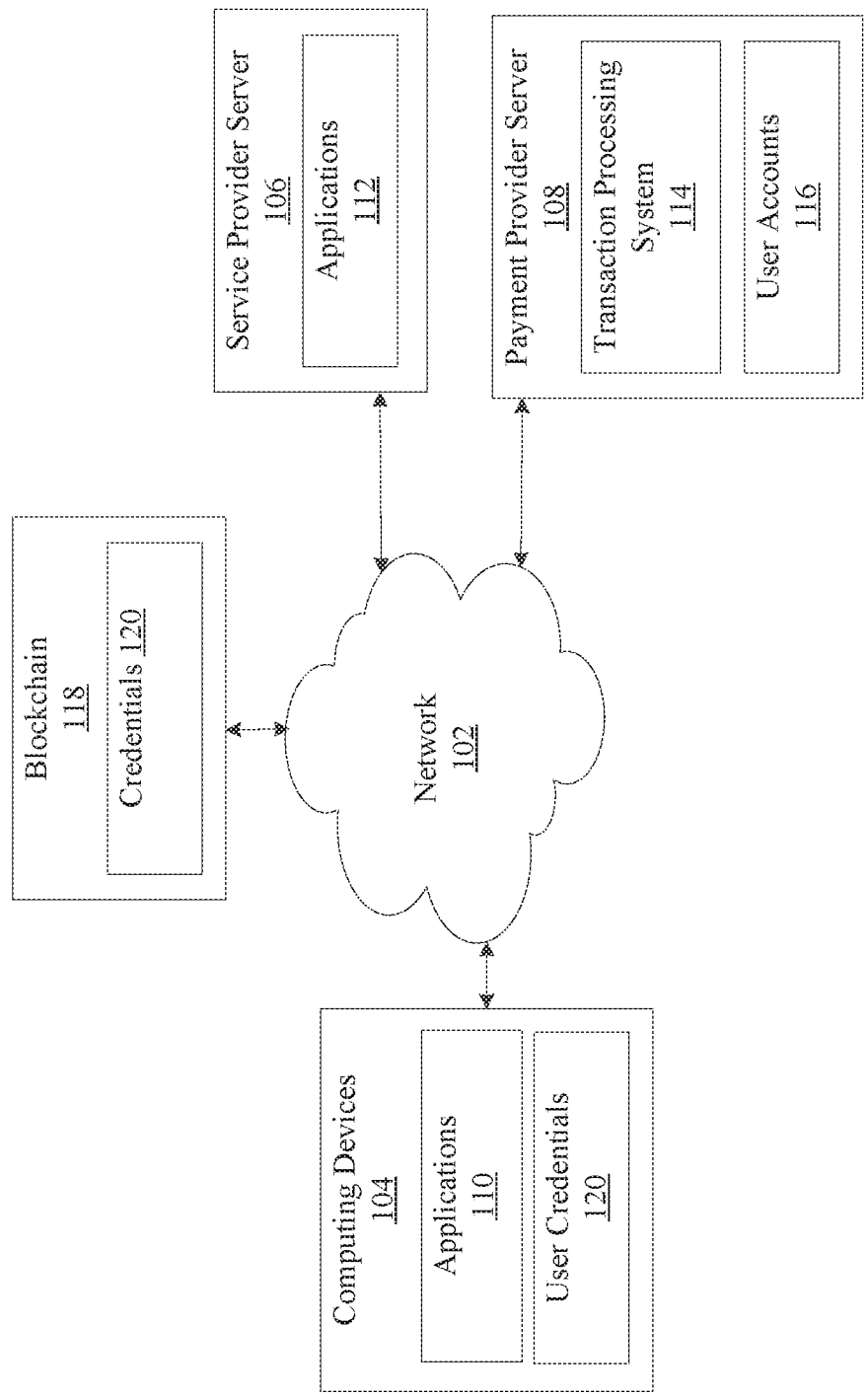
FIG. 1 is an exemplary system where embodiments can be implemented.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In an embodiment, a user may upload one or more user credentials to be stored on a blockchain. The blockchain may allow a user to select different subsets of credentials to be distributed to various servers that may use the credentials to process transactions.

In an embodiment, a computing device may request a server to process a transaction on behalf of a user. The transaction may use a subset of credentials that a user uploaded to the blockchain. To obtain the subset of credentials, a server may send a server public key of a server public-private key pair to the computing device. A key generator of the computing device may use a user private key and the server public key to generate a user public key. The user public key may specify access rights to a subset of credentials that the server may obtain from the blockchain. Once the key generator generates the user public key, the computing device may transmit the user public key to the server.

In an embodiment, the server may receive the user public key and verify that the user public key was generated using the server public key. If the verification is successful, the server may transmit the user public key and the server private key to a decryption processor.

In an embodiment, the decryption processor may retrieve the credentials that are specified in the user public key from the blockchain. The decryption processor may also use the server private key and the user public key to generate an identity token that includes the retrieved credentials. In addition to the retrieved credentials, the decryption processor may also include time and permission constraints in the identity token. The time constraints may specify a time period during which the server may use the identity token to process the transaction, and the permission constraint may specify the types of transactions that the identity token can be used to process. In another example, the identity token may include a transaction list that specifies transactions or transaction types that have permissions to access the credentials included in the identity token. Once the decryption processor generates the identity token, the decryption processor may transmit the identity token to the server.

The server may receive the identity token and use the identity token to obtain credentials for processing the transaction. As such, sensitive data is securely stored through the use of a blockchain, and access of the data can be tracked and its use controlled, thereby greatly reducing the risks of data theft.

FIG. 1 is an exemplary system 100 where embodiments can be implemented. System 100 includes a network 102. Network 102 may be implemented as a single network or a combination of multiple networks. For example, in various embodiments, network 102 may include the Internet or one or more intranets, landline networks, wireless networks, and/or other appropriate types of networks. Network 102 may be a small scale communication network, such as a private or local area network, or a larger scale network, such as a wide area network.

Various components that are accessible to network 102 may be computing device(s) 104, service provider server(s) 106, and payment provider server(s) 108. Computing devices 104 may be portable and non-portable electronic devices under control of a user and configured to transmit, receive, and manipulate data from service provider server(s) 106 and payment provider server(s) 108 over network 102. Example computing devices 104 include desktop computers, laptop computers, tablets, smartphones, wearable computing devices, eyeglasses that incorporate computing devices, implantable computing devices, etc.

Computing devices 104 may include one or more applications 110. Applications 110 may be pre-installed on the computing devices 104, installed on the computing devices 104 using portable memory storage devices, such as compact disks or thumb-drives, or be downloaded to the computing devices 104 from service provider server(s) 106 and/or payment provider server(s) 108. Applications 110 may execute on computing devices 104 and receive instructions and data from a user, from service provider server(s) 106, and payment provider server(s) 108.

Example applications 110 may be payment transaction applications. Payment transaction applications may be configured to transfer money world-wide, receive payments for goods and services, manage money spending, etc. Further, applications 110 may be under an ownership or control of a payment service provider, such as PAYPAL®, Inc. of San Jose, Calif., USA, a telephonic service provider, a social networking service provider, and/or other service providers. Applications 110 may also be analytics applications. Analytics applications perform business logic, provide services, and measure and improve performance of services and functions of other applications that execute on computing devices 104 based on current and historical data. Applications 110 may also be security applications for implementing client-side security features, programmatic client applications for interfacing with appropriate application programming interfaces (APIs) over network 102, communication applications, such as email, texting, voice, and instant messaging applications that allow a user to send and receive emails, calls, texts, and other notifications through network 102, and the like. Applications 110 may be location detection applications, such as a mapping, compass, and/or global positioning system (GPS) application, social networking applications and/or merchant applications. Additionally, applications 110 may be service applications that permit a user of computing device 104 to receive, request and/or view information for products and/or services, and also permit the user to purchase the selected products and/or services.

In an embodiment, applications 110 may utilize numerous components included in computing device 104 to receive input, store and display data, and communicate with network 102. Example components are discussed in detail in FIG. 6.

As discussed above, one or more service provider servers 106 may be connected to network 102. Service provider server 106 may also be maintained by a service provider, such as PAYPAL®, a telephonic service provider, social networking service, and/or other service providers. Service provider server 106 may be software that executes on a computing device configured for large scale processing and that provides functionality to other computer programs, such as applications 110 and applications 112 discussed below.

In an embodiment, service provider server 106 may initiate and direct execution of applications 112. Applications 112 may be counterparts to applications 110 executing on computing devices 104 and may process transactions at request of applications 110. For example, applications 112 may be financial services applications configured to transfer money world-wide, receive payments for goods and services, manage money spending, etc., that receive message from the financial services applications executing on computing device 104. Applications 112 may be security applications configured to implement client-side security features or programmatic client applications for interfacing with appropriate application programming interfaces (APIs) over network 102. Applications 112 may be communication applications that perform email, texting, voice, and instant messaging functions that allow a user to send and receive emails, calls, texts, and other notifications over network 102. In yet another embodiment, applications 112 may be location detection applications, such as a mapping, compass, and/or GPS applications. In yet another embodiment, applications 112 may also be incorporated into social networking applications and/or merchant applications.

In an embodiment, applications 110 and applications 112 may process transactions on behalf of a user. In some embodiments, to process transactions applications 110, 112 may request payments for processing the transactions via payment provider server 108. For instance, payment provider server 108 may be a software application that is configured to receive requests from applications 110, 112 that cause the payment provider server 108 to transfer funds of a user using application 110 to service provider associated with application 112. Thus, applications 110 and 112 may receive user data, including user authentication data, for processing any number of electronic transactions, such as through payment provider server 108.

In an embodiment, payment provider servers 108 may be maintained by a payment provider, such as PAYPAL®. Other payment provider servers 108 may be maintained by or include a merchant, financial services provider, credit card provider, bank, and/or other payment provider, which may provide user account services and/or payment services to a user. Although payment provider servers 108 are described as separate from service provider server 106, it is understood that one or more of payment provider servers 108 may include services offered by service provider server 106 and vice versa.

Each payment provider server 108 may include a transaction processing system 114. Transaction processing system 114 may correspond to processes, procedures, and/or applications executable by a hardware processor. In an embodiment, transaction processing system 114 may be configured to receive information from one or more applications 110 executing on computing devices 104 and/or applications 112 executing on service provider server 106 for processing and completion of financial transactions. Financial transactions may include financial information corresponding to user debit/credit card information, checking account information, a user account (e.g., payment account with a payment provider server 108), or other payment information. Transaction processing system 114 may complete the financial transaction for the purchase request by providing payment to application 112 executing on service provider server 106.

Payment provider server 108 may also include user accounts 116. Each user account 116 may be established by one or more users using applications 110 with payment provider server 108 to facilitate payment for goods and/or services offered by applications 112. User accounts 116 may include user information, such as name, address, birthdate, payment/funding information, travel information, additional user financial information, and/or other desired user data. In a further embodiment, user accounts 116 may be stored in a database or another memory storage described in detail in FIG. 6.

In an embodiment, service provider server 106, payment provider server 108 and/or applications 112 and transaction processing system 114 may require credentials of users using applications 110 on computing devices 104 to process transactions. An example credential 120 may include a user name, one or more user addresses, telephone number(s), a social security number, a date of birth, driver's license information, passport information, password, answers to security questions, etc.

In some embodiments, credentials 120 that service provider server 106 may use to process transactions may be different from credentials 120 that payment provider server 108 uses to process transactions. For example, service provider server 106 may use credentials 120 that include a user name, a password, and an address, but payment provider server 108 may use credentials 120 that include a user name, an address, driver's license information, a social security number, a password, and/or a credit card number.

In an embodiment, blockchain 118 may store credentials 120. Blockchain 118 may contain a continuously growing list of records or blocks which are linked together. Unlike centralized systems that store data in a single location, the blocks in blockchain 118 may be distributed among multiple computing devices (not shown) over network 102. Blockchain 118 may store each credential 120 in single block or in multiple blocks. Accordingly, credentials 120 that belong to the same user may be stored on different computing devices.

In an embodiment, users using computing device 104 may enter their credentials 120 into computing device 104 and have computing device 104 upload credentials 120 to blockchain 118. Accordingly, blockchain 118 may store credentials 120 from multiple users, which may be cryptographically encrypted as will be discussed below.

In another embodiment, users may use blockchain 118 to generate targeted subsets of credentials 120 that may be specific to service provider server 106, application 112, payment provider server 108, transaction processing system 114, etc. For example, a user may use computing device 104 to grant access rights to a first subset of credentials 120 to service provider server 106 and a second subset of credentials 120, different from the first subset of credentials, to payment provider server 108.

Figure 2A:
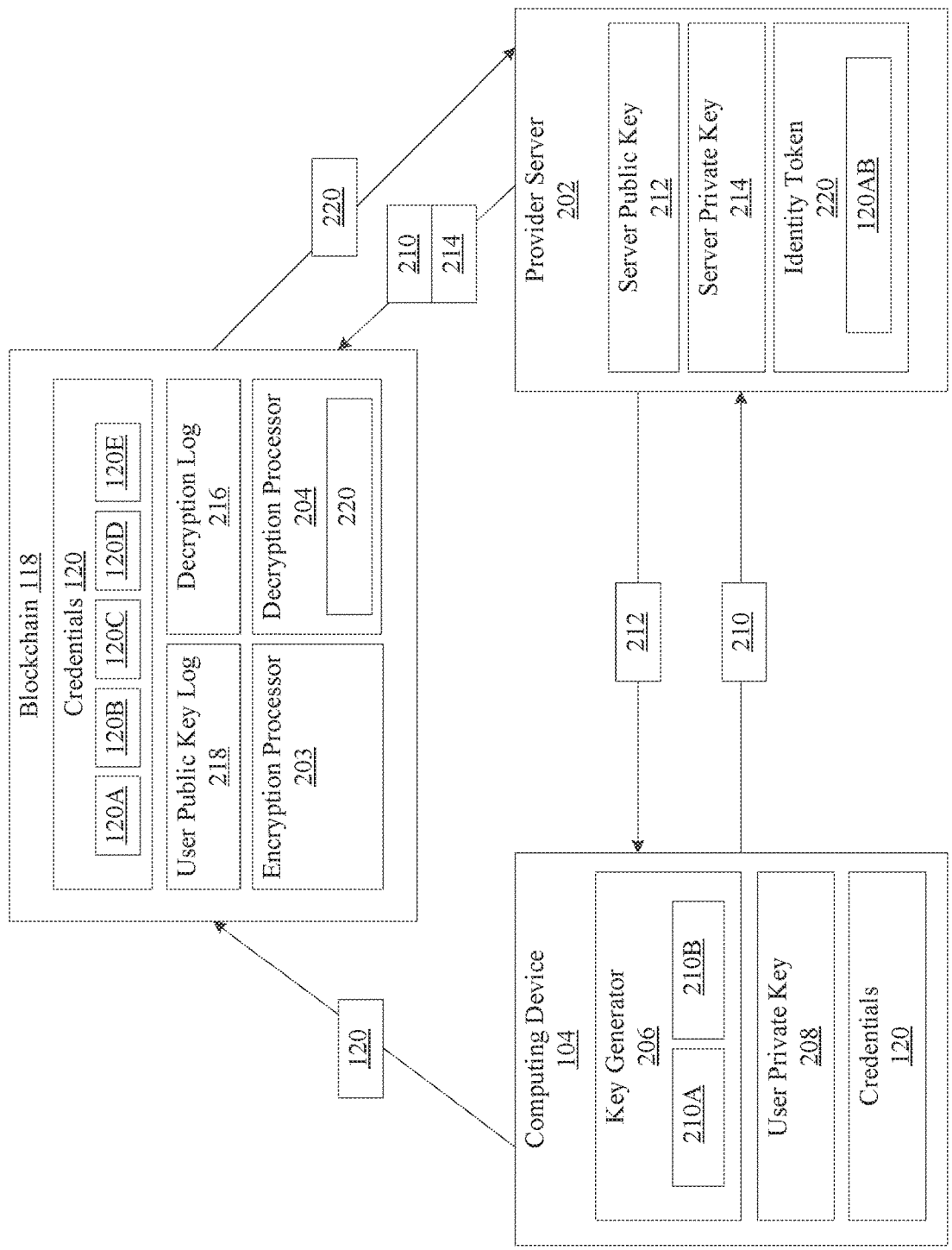
FIGS. 2A and 2B are block diagrams of a system that stores credentials on a blockchain, according to an embodiment.
Figure 2B:
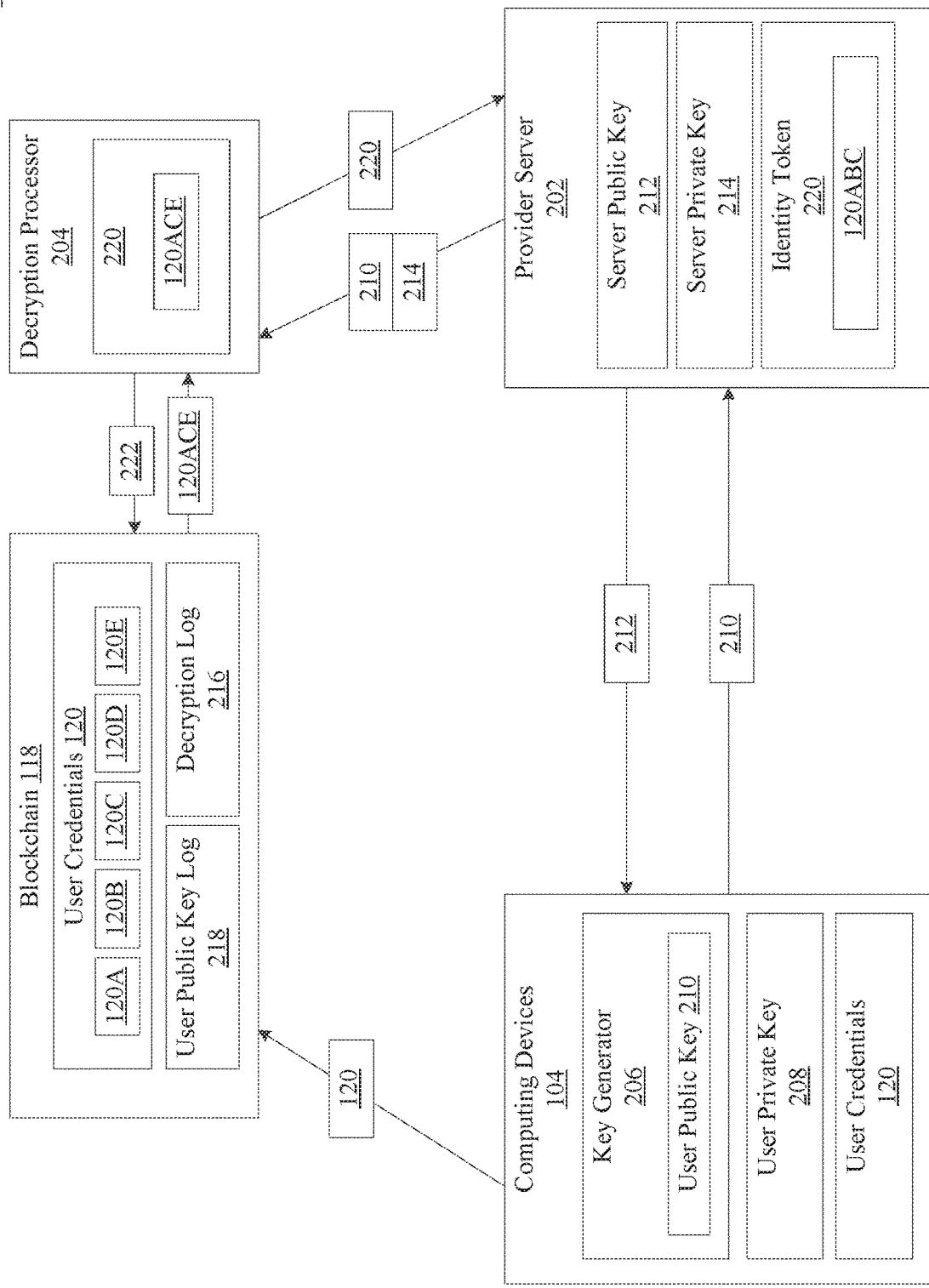

FIGS. 2A and 2B are block diagrams 200A and 200B of systems that store credentials on a blockchain, according to an embodiment. In an embodiment, FIGS. 2A and 2B include a provider server 202. Provider server 202 may be service provider server 106, payment provider server 108, application 112, payment processing system 114, or another system or application that may process transactions that utilize credentials 120 stored on blockchain 118.

As illustrated in FIG. 2A, blockchain 118 may store credentials 120 from multiple users. Example credentials 120A, 120B, 120C, 120D, and 120E from credentials 120 may be credentials associated with a single user. In one example, credentials may include a password, a date of birth, all or part of a social security number, a funding source account number, answers to security questions, a user name, or other credentials needed by an entity to authenticate a user and process a request from the user.

As discussed above, blockchain 118 can securely store credentials 120. To securely store credentials 120, blockchain 118 may include an encryption processor 203 and a decryption processor 204. Encryption processor 203 may encrypt credentials 120A-E once user uploads credentials 120A-E to blockchain 118. Decryption processor 204 may decrypt credentials 120A-E encrypted by encryption processor 203 when credentials 120A-E are retrieved from blockchain 118. Encryption processor 203 and decryption processor 204 may encrypt and decrypt credentials 120 using public keys, private keys, one or more cryptographic algorithms, such as, an AES algorithm, blowfish algorithm, DES algorithm, RSA algorithm, twofish algorithm, etc.

As discussed above, blockchain 118 may receive credentials 120 from computing device 104. For example, a user using computing device 104 may enter or upload credentials 120 to computing device 104. Once computing device 104 receives credentials 120 from the user, computing device 104 may upload credentials 120 to blockchain 118.

In an embodiment, computing device 104 may also include a mechanism that allows a user to grant access rights to credentials 120 or a subset of credentials 120 to provider server 202. To allow users to grant targeted access rights to credentials 120 to different applications, computing device 104 may include a key generator 206. Key generator 206 may generate a user private key 208 and a use public key 210. In an embodiment, user private key 208 and user public key 210 may form a public-private key pair, where user private key 208 may encrypt information that may be decrypted only by user public key 210 or vice versa.

In an embodiment, user private key 208 may be stored securely within computing device 104. For example, user private key 208 may be stored in an encrypted form that can be decrypted by a user or key generator 206 or be included within memory of computing device 104 that may be accessed by an authorized or authenticated user.

In an embodiment, a user may use user public key 208 to grant access rights to credentials 120. For example, a user may issue input that may cause key generator 206 to generate user public keys 210 that grant access rights to different credentials 120 or different subsets of credentials 120. For example, key generator 206 may generate user public key 210A that grants access rights to credentials 120A and 120B or user public key 210B that grants access rights to credentials 120A, 120C, and 120E.

Because multiple user public keys 210 may exist for a single user private key 208, user public keys 210 may be dynamic public keys and may form multiple public-private key pairs with the same user private key 208.

In an embodiment, key generator 206 may generate user public key 210 based on a request from provider server 202. For example, computing device 104 may request for provider server 202 to process a transaction. To process the transaction, however, provider server 202 may require one or more credentials 120. To obtain credentials 120 from blockchain 118, provider server 202 may issue a request to computing device 104. The request may request access rights to credentials 120, such as credentials 120A and 120B, or credentials 120A, 120C, and 120E in some embodiments.

In an embodiment, provider server 202 may include a server public key 212 and a server private key 214. Server public key 212 and server private key 214 may be a public-private key pair. Unlike user private key 208 and user public keys 210, server public key 212 may be a static key because server public key 212 may correspond to a single server private key 214.

In an embodiment, server public key 212 and server private key 214 may be downloaded to provider server 202, generated on provider server 202, etc.

In an embodiment, server public key 212 and server private key 214 may be specific to provider server 202. For example, service provider server 106 may have server public key 212A and server private key 214A and payment provider server 108 may have a different server public key 212B and server private key 214B (not shown).

Going back to the request for access rights that provider server 202 transmits to computing device 104, the request may include server public key 212 in some embodiments.

Once computing device 104 receives a request for access rights from provider server 202, computing device 104 may request and receive input from a user. The input may indicate that the user grants access rights to one or more credentials 120 that provider server 202 may retrieve from blockchain 118. For example, user may provide input that grants provider server 202 access rights to credentials 120A and 120B, or credentials 120A, 120C, and 120E, in some embodiments.

In an embodiment, key generator 206 may use user private key 206 and server public key 212 to generate user public key 210. If computing device 104 receives user input that grants access rights to credentials 120A and 120B, user public key 210 may be used to retrieve credentials 120A and 120B from blockchain 118 as will be described below.

In an embodiment, once key generator 206 generates user public key 210, computing device 104 may transmit a response to provider server 202 that includes user public key 210.

Once provider server 202 receives user public key 210, provider server 202 may use user public key 210 to retrieve credentials 120 from blockchain 118 in some embodiments. To retrieve credentials 120, provider server 202 may generate a request to blockchain 118. The request to blockchain 118 may include user public key 210 and server private key 214.

As discussed above, blockchain 118 includes decryption processor 204. Once blockchain 118 receives a request that includes user public key 210 and server private key 214, blockchain 118 may use decryption processor 204 to process the request. In addition to decrypting credentials 120 that were encrypted using encryption processor 203, decryption processor 204 may also use user public key 210 to obtain credentials 120 that are specified in user public key 210. For example, if user public key 210 includes access rights for provider server 202 to obtain credentials 120A and 120B, decryption processor 204 may obtain credentials 120A and 120B from blockchain 118.

To obtain credentials 120A and 120B, decryption processor 204 may identify one or more blocks in blockchain 118 that store credentials 120A and 120B and retrieve credentials 120A and 120B from the blocks. Once retrieved, decryption processor 204 may decrypt credentials 120A and 120B using reverse decryption techniques that were used to encrypt credentials 120A and 120B when computing device 104 uploaded credentials 120A and 120B to blockchain 118.

In an embodiment, decryption processor 204 may generate an identity token 220. Identity token 220 may include decrypted credentials 120, such as credentials 120A and 120B.

In an embodiment, identity token 220 may be specific to provider server 202. This is because decryption processor 204 may use server private key 214 or a combination of server private key 214 and user public key 210 to generate identity token 220.

In an embodiment, decryption processor 204 may also include restrictions for when and/or how provider server 202 may use identity token 220. In one example, decryption processor 203 may include a time restriction. The time restriction may specify a time period, such as a number of hours, days, etc., during which provider server 202 may use identity token 220 to process one or more transactions. The time period may begin from the time decryption processor 204 generated identity token 220, from the time decryption processor 204 transmitted identity token 220 or from the time provider server 202 received identity token 220, in some embodiments. Alternatively, the time restriction may specify the date and time when identity token 220 expires. After identity token 220 expires, provider server 202 may issue another request for credentials 120 to computing device 104. Similarly, a restriction may limit the number of times credentials 120 can be used/accessed with a certain time period.

In another example, identity token 220 may include processing restrictions. Processing restrictions may restrict the types of transactions that may use identity token 220 to the transaction types specified in the permission restrictions. For example, if identity token 220 includes a processing restriction that restricts provider server 202 to use identity token 220 in financial transactions, provider server 202 may not be able to use identity token 220 in an information request by another server for user credentials. In another example, processing restrictions may include a transaction list that includes one or more transactions or transaction types that have permissions to access one or more credentials 120 included in identity token 220.

In an embodiment, once decryption processor 204 generates identity token 220, blockchain 118 may transmit identity token 220 to provider server 202. Upon receipt of identity token 220, provider server 202 may store identity token 220 in memory (not shown) for future use in one embodiment. In another embodiment, provider server 202 may use identity token 220 in one of transactions that may use credential 120A and/or 120B.

In an embodiment, blockchain 118 may include a user public key log 218 and decryption log 216. User public key log 218 may store entries that identify that computing device 104 transmitted user public key 210 to provider server 202. Example entry may include identity or an Internet Protocol ("IP") address of computing device 104 that transmits user public key 210, identity or an IP address of provider server 202 that receives user public key 210, a user name, an application name that executes on provider server 202 and receives user public key 210, timestamps associated with when user public key 210 was generated or transmitted, etc.

In an embodiment, decryption log 216 may store entries that identify whether decryption processor 204 decrypted credentials 120. Example entries may include the name of IP address of provider server 202, name or identity of an application that executes on provider server 202, a number of credentials that decryption processor 204 decrypted, identity of a user associated with decrypted credentials 120, timestamps associated with when identity token 220 was generated or request that included user public key 210 and server private key 214 was received at decryption processor 204, etc.

As discussed above, FIG. 2B is a block diagram 200B that uses credentials 120. FIG. 2B illustrates another embodiment of a location of decryption processor 204. Unlike FIG. 2A, decryption processor 204 may not be included in blockchain 118. Rather, decryption processor 204 may be outside of blockchain 118. For example, decryption processor 204 may be included on a computing device that is separate from blockchain 118 or decryption processor 204 may be included on provider server 202 (not shown).

In an embodiment, decryption processor 204 may use user public key 210 and server private key 214 to determine credentials 120 requested by provider server 202. For example, user public key 210 may indicate that provider server 202 may request credentials 120A, 120C, and 120E. Once decryption processor 204 identifies credentials 120, decryption processor 204 may generate a request 222 to blockchain 118. Request 222 may request for blockchain 118 to obtain credentials 120A, 120C, and 120E from one or more blocks in blockchain 118 and transmit credentials 120A, 120C, and 120E to decryption processor 204. Once decryption processor 204 receives credentials 120A, 120C, and 120E, decryption processor 204 may decrypt credentials 120A, 120C, and 120E as discussed above. Decryption processor 204 may also generate identity token 220 that includes credentials 120A, 120C, and 120E and transmit identity token 220 to provider server 202.

In an embodiment, once provider server 202 receives identity token 220, provider server 202 may process a transaction using identity token 220 or direct identity token 220 to one of the applications that process a transaction using identity token 220.

Figure 3:
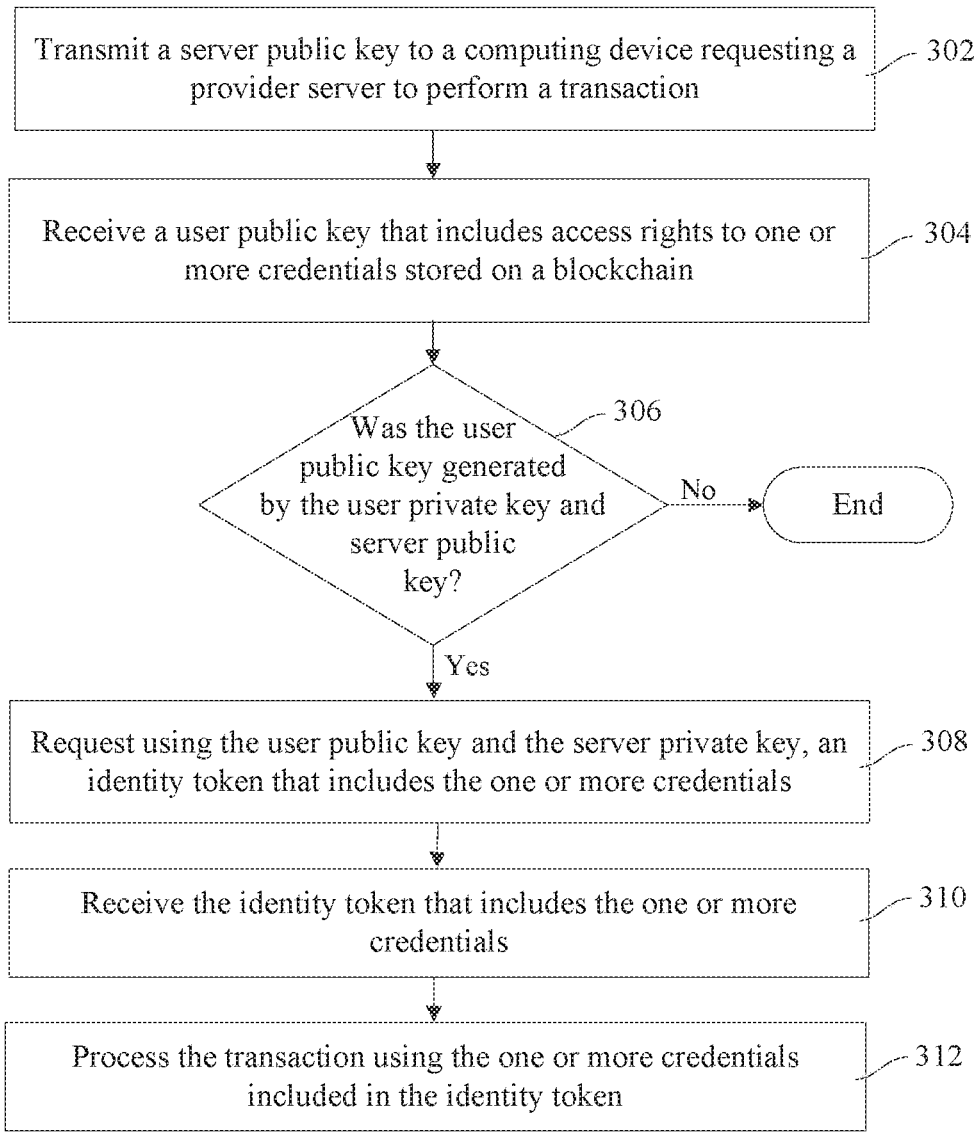
FIG. 3 is a flowchart of a method for retrieving credentials with a user public key, according to an embodiment.

FIG. 3 is a flowchart of a method 300 for obtaining credentials with a user public key, according to an embodiment. Method 300 may be performed using hardware and/or software components described in FIGS. 1-2. Note that one or more of the operations may be deleted, combined, or performed in a different order as appropriate.

At operation 302, a server public key is transmitted. For example, provider server 202 transmits server public key 212 to computing device 104. As discussed above, provider server 202 may transmit server public key 212 that is associated with provider server 202 to computing device 104 when computing device 104 requests for provider server 202 to perform a transaction.

At operation 304, a user public key is received. For example, provider server 202 receives user public key 210 that includes access rights to one or more credentials 120 associated with the user and that are stored on blockchain 118. For example, as discussed in FIG. 2A, user public key 210 may include access rights to credentials 120A and 120B from credentials 120.

At operation 306, a determination is made regarding whether the user public key was generated by the user private key and the server public key. For example, provider server 202 verifies that user public key 210 has been generated based on user private key 208 and/or server public key 212. If user public key 210 is authenticated, method 300 proceeds to operation 308. Otherwise, method 306 ends.

At operation 308, an identity token is requested. For example, provider server 202 requests identity token 220 from decryption processor 204. As discussed above decryption processor 204 may be included in blockchain 118 or another computing device that communicates with blockchain 118. The request may include user public key 210 and server private key 214. As discussed above, identity token 220 may include one or more credentials 120 for which access rights were granted in user public key 210.

At operation 310, the identity token is received. For example, provider server 202 receives identity token 220 from decryption processor 204 that executes on a computing device or from blockchain 118.

At operation 312, a transaction is processed. For example, provider server 202 processes transaction using identity token 220. For example, an application that requested one or more credentials 120 for a user may retrieve the one or more credentials 120 from identity token 220 and process the transaction using the retrieved credentials 120.

Figure 4:
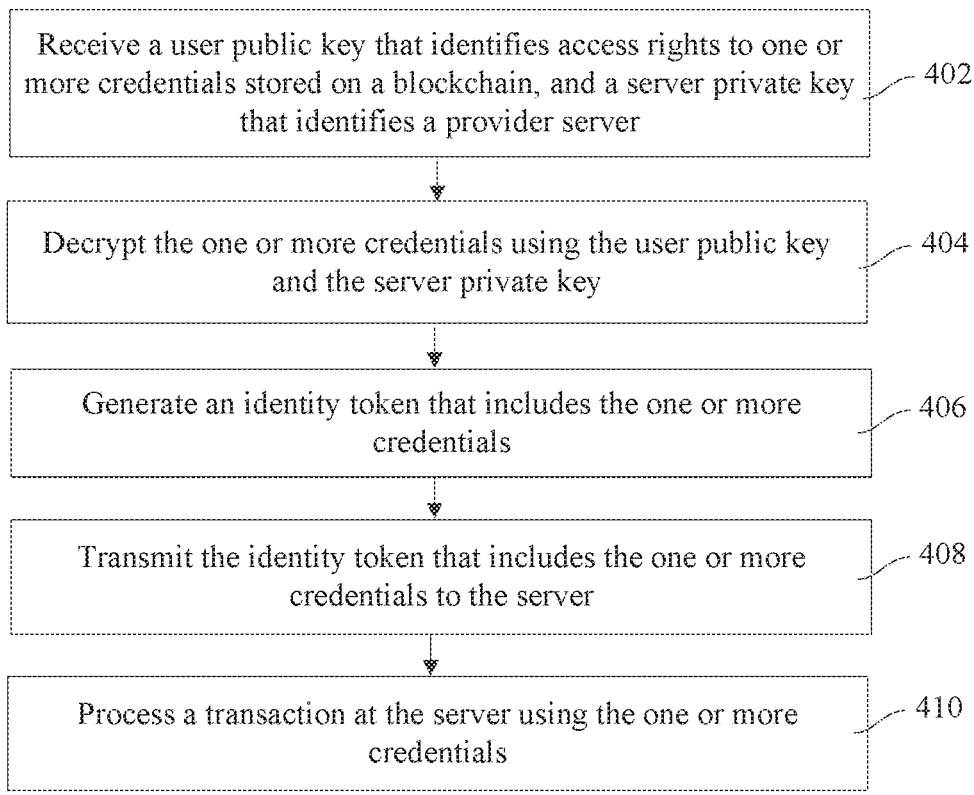
FIG. 4 is a flowchart of a method for retrieving credentials from a blockchain, according to an embodiment.

FIG. 4 is a flowchart of a method 400 for retrieving credentials from a blockchain, according to an embodiment. Method 400 may be performed using hardware and/or software components described in FIGS. 1-2. Note that one or more of the operations may be deleted, combined, or performed in a different order as appropriate.

At operation 402, a user public key and a server private key are received. For example, decryption processor 204 receives user public key 210 that identifies access to one or more credentials 120, and server private key 214 that identifies provider server 202. As discussed above, decryption processor 204 may receive user public key 210 and server private key 214 from provider server 202.

At operation 404, credentials identified in the user public key are decrypted. For example, decryption processor 204 may decrypt one or more credentials 120 identified in user public key 210. In case where user public key 210 identifies credentials 120A and 120B from credentials 120, decryption processor 204 may retrieve credentials 120A and 120B from blockchain 118 and decrypt credentials 120A and 120B using reverse techniques that encryption processor 203 used to encrypt credentials 120A and 120B for secure storage on blockchain 118. In case where user public key 210 identifies credentials 120A, 120C, and 120E, decryption processor may retrieve credentials 120A, 120C, and 120E from blockchain 118.

At operation 406, an identity token is generated. For example, decryption processor 204 may generate identity token 220. As described above, identity token 220 may include one or more credentials 120 decrypted in operation 404, such as credentials 120A and 120B or credentials 120A, 120C, and 120E.

At operation 408, the identity token is transmitted. For example, decryption processor 204 transmits identity token 220 to provider server 202.

At operation 410, a transaction is processed. For example, provider server 202 or an application that executes within provider server 202 processes the transaction using identity token 220 and one or more credentials 120 included in the identity token 220 as discussed in operation 312.

Figure 5:
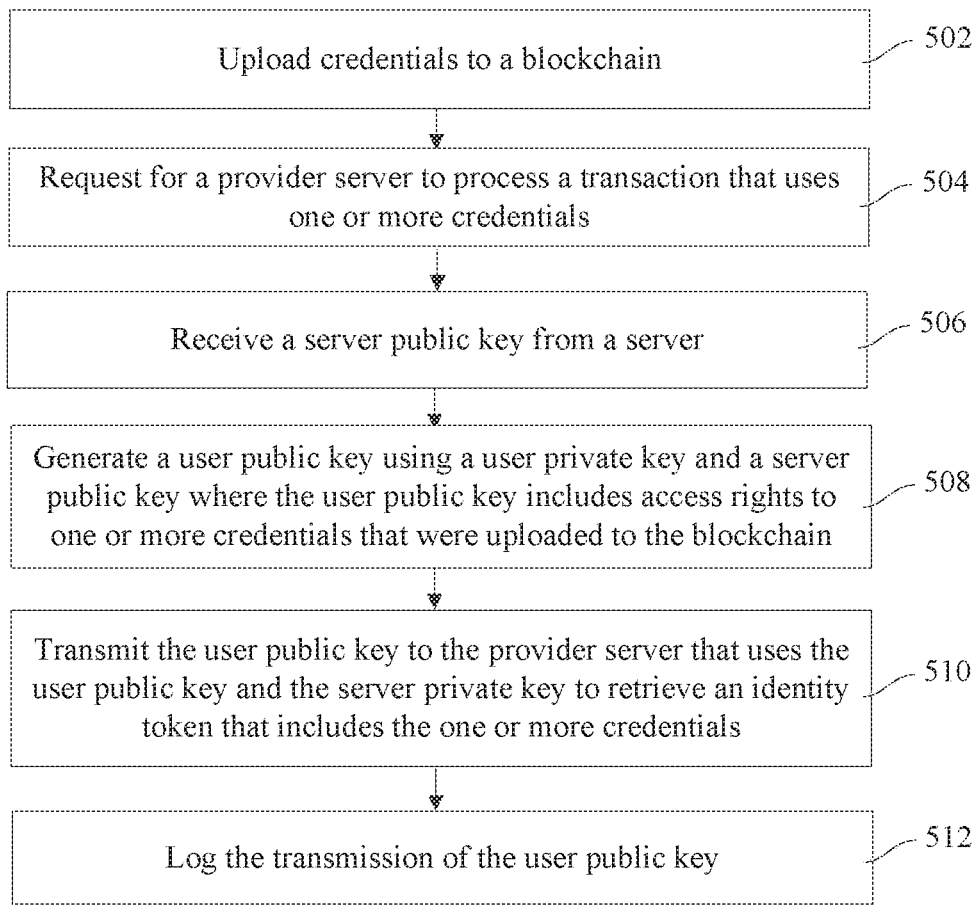
FIG. 5 is a flowchart of a method for generating a user public key, according to an embodiment.

FIG. 5 is a flowchart of a method 500 for generating a user public key, according to an embodiment. Method 500 may be performed using hardware and/or software components described in FIGS. 1-2. Note that one or more of the operations may be deleted, combined, or performed in a different order as appropriate.

At operation 502, credentials are uploaded. For example, computing device 104 may receive instructions from a user to upload credentials 120 that are associated with the user to blockchain 118. For example, a user may cause computing device 104 to upload credentials 120A, 120B, 120C, 120D, and 120E to blockchain.

At operation 504, a request to processes a transaction is generated. For example, computing device 104 may request for provider server 202 or one of the applications that execute on provider server 202 to process a transaction. The transaction may use one or more credentials 120 associated with the user. For example, the transaction may use credentials 120A and 120B. In another example, the transaction may use credentials 120A, 120B, 120C, 120D, and 120E.

At operation 506, a server public key is received. For example, computing device 104 may receive server public key 212 from provider server 202.

At operation 508, a user public key is generated. For example, key generator 206 of computing device 104 may generate user public key 210 using user private key 208 and server public key 212. As discussed above, user public key 210 includes access rights to one or more credentials 120 that were uploaded to blockchain 118 in operation 502. For example, user public key 210 may include rights to credentials 120A and 120B.

At operation 510, the user public key is transmitted. For example, computing device 104 may transmit user public key 210 to provider server 202. As discussed above, provider server 202 may use user public key 210 and server private key 214 to retrieve identity token 220 that includes one or more credentials 120. As further discussed above, one or more credentials 120 included in identity token 220 may be credentials 120 for which user public key 210 includes access rights, such as credentials 120A and 120B.

At operation 512, a transmission of operation 510 is logged. For example, user public key log 218 may generate an entry that includes the name of the user, the IP address of computing device 104, and/or the IP address of provider server 202.

Going back to FIG. 2A, provider server 202 may include an application such as a mobile phone wallet application. When a user registers with the mobile wallet application, the mobile wallet application may require credentials 120, such as a user name, password, address, telephone number and credit card information. To obtain credentials 120 from blockchain 118, provider server 202 that includes a server end for the mobile wallet application may transmit server public key 212 (the mobile wallet public key) to computing device 104 that the user uses to register with the mobile wallet application.

Once computing device 104 receives the mobile wallet public key, key generator 206 may use the mobile wallet public key and user private key to generate user public key 210. Computing device 104 may transmit user public key 210 to provider server 202 and the transmission may be recorded in user public key log 216.

In an embodiment, provider server 202 may receive user public key 210 and transmit user public key 210 with server private key 214 (the mobile wallet private key) to blockchain 118 that stores credentials 120.

In an embodiment, decryption processor 204 may receive user public key 210 and the mobile wallet private key and obtain credentials 120 specified in user public key 210. As discussed above, credentials 120 may include a user name, password, address, telephone number and credit card information. In an embodiment, decryption processor 204 may retrieve credentials 120 and generate identity token 220 that includes the retrieved credentials. As discussed above, decryption processor 204 may also include time and/or permission constraints into identity token 220 that specify a time period or an expiration time for identity token 220 and/or transactions that may use identity token 220.

In an embodiment, provider server 202 may receive identity token 220 and use identity token 220 to retrieve credentials 120 and set up a user account within the server end of the mobile wallet application.

Figure 6:
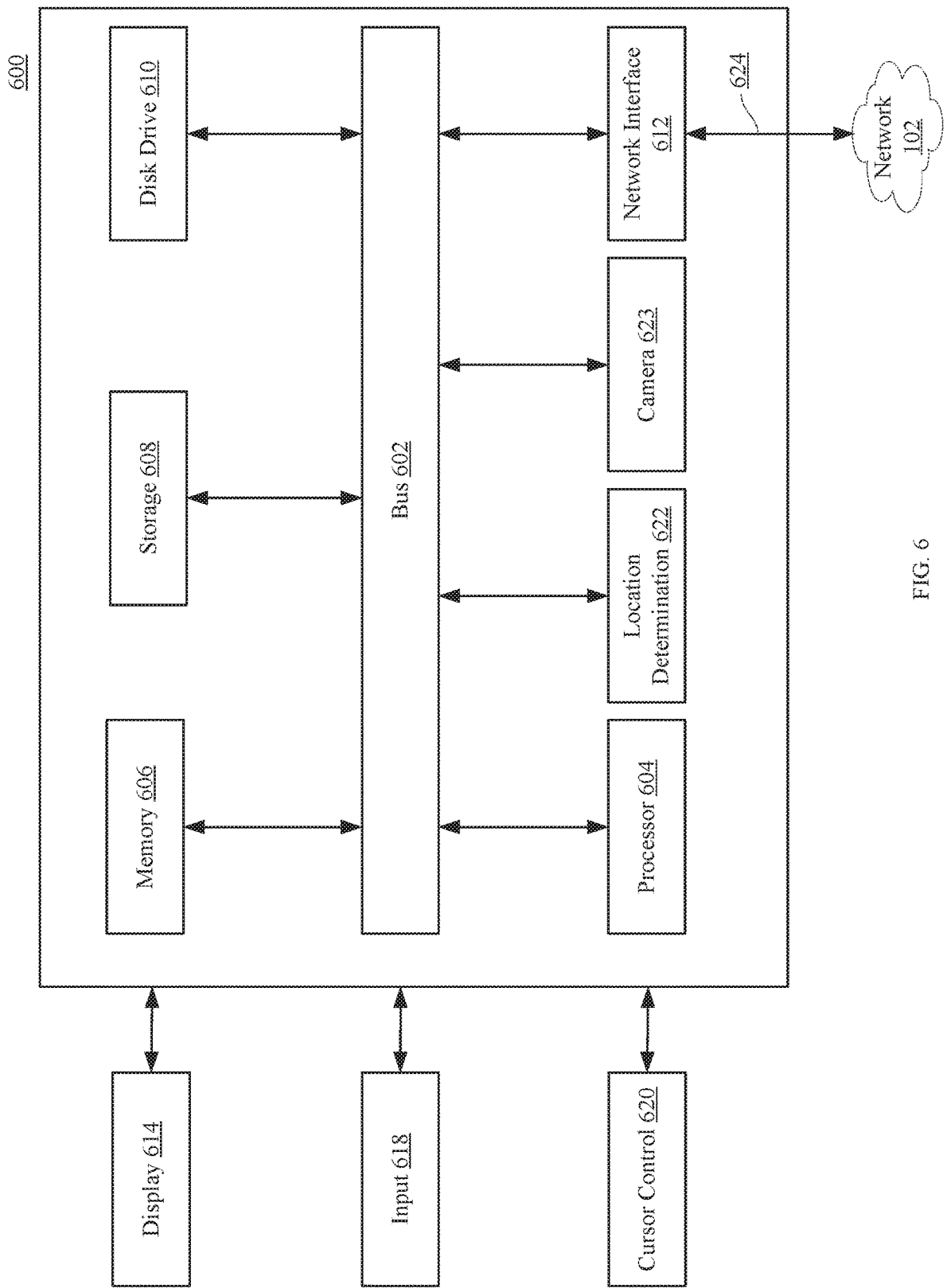
FIG. 6 is a block diagram of a computer system suitable for implementing one or more components or operations in FIGS. 1-5 according to an embodiment.

Referring now to FIG. 6 an embodiment of a computer system 600 suitable for implementing, the systems and methods described in FIGS. 1-5 is illustrated.

In accordance with various embodiments of the disclosure, computer system 600, such as a computer and/or a server, includes a bus 602 or other communication mechanism for communicating information, which interconnects subsystems and components, such as a processing component 604 (e.g., processor, micro-controller, digital signal processor (DSP), graphics processing unit (GPU), etc.), a system memory component 606 (e.g., RAM), a static storage component 608 (e.g., ROM), a disk drive component 610 (e.g., magnetic or optical), a network interface component 612 (e.g., modem or Ethernet card), a display component 614 (e.g., CRT or LCD), an input component 618 (e.g., keyboard, keypad, or virtual keyboard), a cursor control component 620 (e.g., mouse, pointer, or trackball), a location determination component 622 (e.g., a Global Positioning System (GPS) device as illustrated, a cell tower triangulation device, and/or a variety of other location determination devices known in the art), and/or a camera component 623. In one implementation, the disk drive component 610 may comprise a database having one or more disk drive components.

In accordance with embodiments of the disclosure, the computer system 600 performs specific operations by the processor 604 executing one or more sequences of instructions contained in the memory component 606, such as described herein with respect to the mobile communications devices, mobile devices, and/or servers. Such instructions may be read into the system memory component 606 from another computer readable medium, such as the static storage component 608 or the disk drive component 610. In other embodiments, hard-wired circuitry may be used in place of or in combination with software instructions to implement the disclosure.

Logic may be encoded in a computer readable medium, which may refer to any medium that participates in providing instructions to the processor 604 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 610, volatile media includes dynamic memory, such as the system memory component 606, and transmission media includes coaxial cables, copper wire, and fiber optics, including wires that comprise the bus 602. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the disclosure, execution of instruction sequences to practice the disclosure may be performed by the computer system 600. In various other embodiments of the disclosure, a plurality of the computer systems 600 coupled by a communication link 624 to the network 102 (e.g., such as a LAN, WLAN, PTSN, and/or various other wired or wireless networks, including telecommunications, mobile, and cellular phone networks) may perform instruction sequences to practice the disclosure in coordination with one another.

The computer system 600 may transmit and receive messages, data, information and instructions, including one or more programs (i.e., application code) through the communication link 624 and the network interface component 612. The network interface component 612 may include an antenna, either separate or integrated, to enable transmission and reception via the communication link 624. Received program code may be executed by processor 604 as received and/or stored in disk drive component 610 or some other non-volatile storage component for execution.

Where applicable, various embodiments provided by the disclosure may be implemented using hardware, software, or combinations of hardware and software. Also, where applicable, the various hardware components and/or software components set forth herein may be combined into composite components comprising software, hardware, and/or both without departing from the scope of the disclosure. Where applicable, the various hardware components and/or software components set forth herein may be separated into sub-components comprising software, hardware, or both without departing from the scope of the disclosure. In addition, where applicable, it is contemplated that software components may be implemented as hardware components and vice-versa.

Software, in accordance with the disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the disclosure to the precise forms or particular fields of use disclosed. As such, it is contemplated that various alternate embodiments and/or modifications to the disclosure, whether explicitly described or implied herein, are possible in light of the disclosure. Having thus described embodiments of the disclosure, persons of ordinary skill in the art will recognize that changes may be made in form and detail without departing from the scope of the disclosure. Thus, the disclosure is limited only by the claims.

What is claimed is:

1. A system, comprising:
a non-transitory memory storing instructions; and
one or more hardware processors coupled to the non-transitory memory and configured to read the instructions from the non-transitory memory to cause the system to perform operations comprising:
transmitting a server public key of a server public-private key pair to a computing device that requests a transaction;
receiving a user public key that identifies a subset of credentials from a plurality of credentials stored on a blockchain;
determining that the user public key was generated based on a user private key and the server public key;
requesting, using a server private key of the server public-private key pair and the user public key, an identity token that indicates the subset of credentials;
receiving the identity token that includes the subset of credentials; and
processing the transaction using the subset of credentials in the identity token.

2. The system of claim 1, wherein the operations further comprise:
logging the receiving of the user public key on the blockchain in a user public key log, wherein the logging includes an identity of a server associated with the server public key and an identity of a user associated with the user public key.

3. The system of claim 1, wherein the operations further comprise:
decrypting the subset of credentials using the user public key and the server private key; and
logging the decrypting on the blockchain.

4. The system of claim 1, wherein the identity token includes a time restriction that specifies a time period that the identity token can be used in the processing of the transaction.

5. The system of claim 1, wherein the identity token indicates at least one permission for at least one transaction that processes the identity token.

6. The system of claim 1, wherein the processing further comprises:
verifying, using the subset of credentials in the identity token, an identity of a user.

7. The system of claim 1, wherein the operations further comprise:
transmitting a server public key from a server public-private key pair to the computing device that requests a second transaction; and
receiving a second user public key that identifies a second subset of credentials from the plurality of credentials stored on the blockchain, wherein the second user public key is different from the user public key.

8. A system comprising:
a non-transitory memory storing instructions; and
one or more hardware processors coupled to the non-transitory memory and configured to read the instructions from the non-transitory memory to cause the system to perform operations comprising:
uploading a plurality of credentials to a blockchain;
receiving a server public key from a server;
generating a user public key with the server public key and a user private key, wherein the user public key includes permissions to retrieve a subset of credentials from the plurality of credentials uploaded to the blockchain; and
transmitting the user public key to the server, whereby the server obtains an identity token using the user public key and a server private key, wherein the identity token includes the subset of credentials from the plurality of credentials.

9. The system of claim 8, wherein the operations further comprise:
logging the transmitting to the blockchain, wherein the logging includes an identity of a user associated with the user public key and an identity of the server associated with the server public key.

10. The system of claim 8, wherein the operations further comprise:
generating a transaction, wherein transaction processing authenticates an identity of a user using the subset of credentials; and
transmitting the transaction for processing to the server.

11. The system of claim 8, whereby the operations further comprise:
storing the plurality of credentials on the blockchain, one block in the blockchain per credential in the plurality of credentials; and
encrypting the credential in the one block using a key in a blockchain public-private key pair.

12. The system of claim 8, wherein the operations further comprise:
receiving a selection of the subset of credentials from the plurality of credentials uploaded to the blockchain, wherein the server authenticates a transaction using the subset of credentials.

13. The system of claim 8, wherein the operations further comprise:
receiving a second server public key from a second server; and
generating a second user public key with the second server public key and the user private key, wherein the second user public key includes permissions to retrieve a second subset of credentials from the plurality of credentials uploaded to the blockchain, wherein the second subset of credentials includes a credential different from the subset of credentials.

14. A method, comprising:
transmitting a server public key of a server public-private key pair to a computing device that requests a transaction;
receiving a user public key that identifies a subset of credentials from a plurality of credentials stored on a blockchain;
determining, using a processor, that the user public key was generated based on a user private key and the server public key;
requesting, using a server private key of the server public-private key pair and the user public key, an identity token that indicates the subset of credentials;
receiving the identity token that includes the subset of credentials; and
processing the transaction using the subset of credentials in the identity token.

15. The method of claim 14, further comprising:
logging the receiving of the user public key on the blockchain in a user public key log, wherein the logging includes an identity of a server associated with the server public key and an identity of a user associated with the user public key.

16. The method of claim 14, further comprising:
decrypting the subset of credentials using the user public key and the server private key; and
logging the decrypting on the blockchain.

17. The method of claim 14, wherein the identity token includes a time restriction that specifies a time period that the identity token can be used in the processing of the transaction.

18. The method of claim 14, wherein the identity token indicates at least one permission for at least one transaction that processes the identity token.

19. The method of claim 14, further comprising:
verifying, using the subset of credentials in the identity token, an identity of a user.

20. The method of claim 14, further comprising:
transmitting a server public key from a server public-private key pair to a computing device that requests a second transaction; and
receiving a second user public key that identifies a second subset of credentials from a plurality of credentials stored on the blockchain, wherein the second user public key is different from the user public key.

* * * * *